(12) United States Patent
Karunakaran et al.

(10) Patent No.: US 10,079,834 B2
(45) Date of Patent: Sep. 18, 2018

(54) SECURE ACCESS TO CLOUD-BASED SERVICES

(71) Applicant: MOBILE IRON, INC., Mountain View, CA (US)

(72) Inventors: Kumara Das Karunakaran, San Jose, CA (US); Vijay Pawar, Palo Alto, CA (US); Ivan Golovenko, Mountain View, CA (US)

(73) Assignee: MOBILE IRON, INC., Mountain View, CA (US)

( * ) Notice: Subject to any disclaimer, the term of this patent is extended or adjusted under 35 U.S.C. 154(b) by 157 days.

(21) Appl. No.: 15/006,917

(22) Filed: Jan. 26, 2016

(65) Prior Publication Data

US 2016/0219044 A1   Jul. 28, 2016

Related U.S. Application Data

(60) Provisional application No. 62/107,927, filed on Jan. 26, 2015.

(51) Int. Cl.
*H04L 29/06* (2006.01)
*G06F 21/33* (2013.01)
*H04W 12/06* (2009.01)

(52) U.S. Cl.
CPC ............ *H04L 63/102* (2013.01); *G06F 21/33* (2013.01); *H04L 63/0815* (2013.01); *H04L 63/0884* (2013.01); *H04L 63/10* (2013.01); *H04L 63/0272* (2013.01); *H04L 63/0281* (2013.01); *H04L 63/0823* (2013.01); *H04W 12/06* (2013.01)

(58) Field of Classification Search
CPC . G06F 21/33; H04L 63/0884; H04L 63/0815; H04L 63/0823; H04W 12/06
See application file for complete search history.

(56) References Cited

U.S. PATENT DOCUMENTS

| | | | |
|---|---|---|---|
| 9,137,131 B1 | 9/2015 | Sarukkai | |
| 9,436,820 B1 | 9/2016 | Gleichauf | |
| 2005/0262357 A1* | 11/2005 | Araujo | H04L 63/0227 713/182 |
| 2006/0264202 A1* | 11/2006 | Hagmeier | H04L 63/0823 455/411 |
| 2007/0234408 A1* | 10/2007 | Burch | G06F 21/31 726/6 |
| 2008/0039085 A1* | 2/2008 | Phan-Anh | H04L 29/12188 455/435.1 |

(Continued)

OTHER PUBLICATIONS

Nath et al., Reconciliation Engine and Metric for Network Vulnerability Assessment, ACM, Aug. 19, 2012, pp. 9-21.

(Continued)

*Primary Examiner* — Thaddeus J Plecha
(74) *Attorney, Agent, or Firm* — Van Pelt, Yi & James LLP

(57) ABSTRACT

Techniques to provide secure mobile access to a cloud-based service are disclosed. In various embodiments, a request to access the cloud-based service is received from a mobile device. A security certificate associated with the request is used to synthesize a basic authentication header associated with the request. The synthesized basic authentication header is sent to the cloud-based service on behalf of the mobile device.

19 Claims, 5 Drawing Sheets

(56) References Cited

U.S. PATENT DOCUMENTS

| | | |
|---|---|---|
| 2008/0060055 A1* | 3/2008 | Lau ............... H04L 63/0823 726/3 |
| 2008/0083025 A1 | 4/2008 | Meijer et al. |
| 2009/0222902 A1* | 9/2009 | Bender ............ H04L 63/0823 726/10 |
| 2009/0249439 A1 | 10/2009 | Olden et al. |
| 2011/0030043 A1* | 2/2011 | Jones ............... H04L 63/0815 726/7 |
| 2011/0265155 A1* | 10/2011 | Liu ............... H04L 63/0815 726/5 |
| 2012/0005745 A1 | 1/2012 | Wei et al. |
| 2012/0179909 A1 | 7/2012 | Sagi et al. |
| 2012/0204025 A1 | 8/2012 | Lau |
| 2012/0272058 A1 | 10/2012 | Wang |
| 2012/0278872 A1 | 11/2012 | Woelfel |
| 2013/0007845 A1 | 1/2013 | Chang et al. |
| 2013/0031356 A1 | 1/2013 | Prince et al. |
| 2013/0305333 A1 | 11/2013 | Katzer et al. |
| 2014/0020072 A1 | 1/2014 | Thomas |
| 2014/0067990 A1 | 3/2014 | Abdelhameed |
| 2014/0122866 A1 | 5/2014 | Haeger et al. |
| 2014/0282817 A1 | 9/2014 | Singer |
| 2014/0331060 A1 | 11/2014 | Hayton |
| 2014/0331297 A1 | 11/2014 | Innes et al. |
| 2014/0344340 A1* | 11/2014 | Tang ............... H04L 67/2823 709/203 |
| 2014/0373130 A1 | 12/2014 | De Oliveira et al. |
| 2015/0026757 A1* | 1/2015 | Reddy ............... H04L 63/10 726/1 |
| 2015/0143504 A1 | 5/2015 | Desai |
| 2015/0341445 A1 | 11/2015 | Nikolov |
| 2016/0105456 A1 | 4/2016 | Thakkar |
| 2016/0173490 A1 | 6/2016 | Phegade |
| 2016/0344736 A1 | 11/2016 | Khait |

OTHER PUBLICATIONS

Mkpong-Ruffin et al., Quantitative Software Security Risk Assessment Model, ACM, Oct. 29, 2007, pp. 31-33.

Ahmad et al., A Multi-Token Authorization Strategy for Secure Mobile Cloud Computing, IEEE, 2014, pp. 136-141.

Balamurugan B et al., Enhanced Framework for Verifying User Authorization and Data Correctness using Token Management System in the Cloud, IEEE, 2014, pp. 1443-1447.

Lakshman et al., Enhancing Enterprise Field Productivity via Cross Platform Mobile Cloud Apps, ACM, Jun. 28, 2011, pp. 27-32.

* cited by examiner

SECURE ACCESS TO CLOUD-BASED SERVICES

CROSS REFERENCE TO OTHER APPLICATIONS

This application claims priority to U.S. Provisional Patent Application No. 62/107,927 entitled IDENTITY PROXY TO PROVIDE MOBILE APP ACCESS CONTROL AND SINGLE SIGN ON filed Jan. 26, 2015 which is incorporated herein by reference for all purposes.

BACKGROUND OF THE INVENTION

Increasingly, mobile devices are incorporating security protections and techniques into the operating system. In many types of device, applications are "sandboxed" and cannot be attacked by other apps on the device. This also means that each application in its own sandbox typically performs the authentication and authorization process. Applications typically cannot share sessions or tokens which can allow one application to authenticate and other applications to leverage the same session/token to get single sign-on, for example.

Security Assertion Markup Language (SAML) is an XML standard that allows user authentication and authorization data to be exchanged. Using SAML, an online service provider (SP) can contact a separate online identity provider (IDP) to authenticate users who are trying to access secure content. In mobile devices, for example, SAML or other standards and/or protocols may be used to authenticate mobile app users to associated online services. However, some apps may not support certain protocols/standards and/or may not support certain techniques, such as redirection to a separate IDP.

In cases where redirection is not supported, SAML provides a mechanism where the client application authenticates with the SP using standard Basic authentication. The SP will then contact the IdP to get an assertion by passing the credentials provided by the user to the IdP. Using Basic authentication in this manner may not be desired, for example in order to prevent a user's Enterprise credentials (such as Enterprise username and password) from being exposed on the mobile device and/or to a cloud-based service provider (SP).

BRIEF DESCRIPTION OF THE DRAWINGS

Various embodiments of the invention are disclosed in the following detailed description and the accompanying drawings.

DETAILED DESCRIPTION

Figure 1:
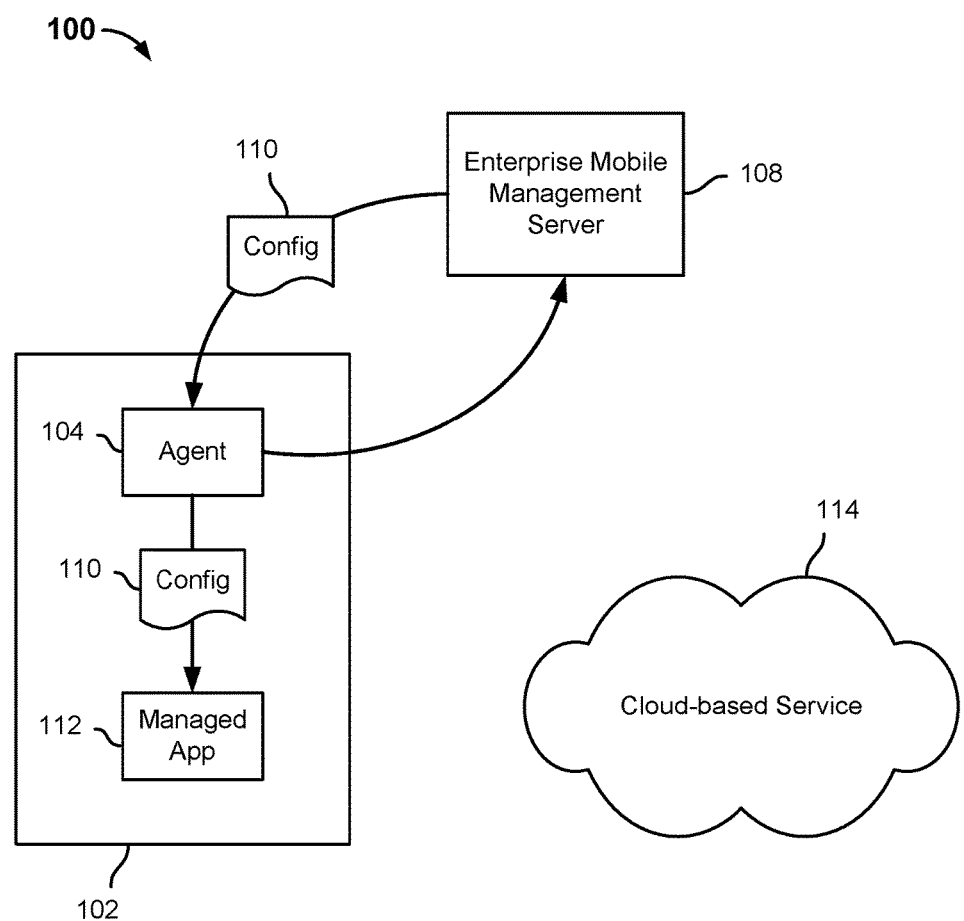
FIG. 1 is a block diagram illustrating an embodiment of a system to configure a mobile app to access to a cloud-based service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A secure identity proxy for use with mobile apps is disclosed. In various embodiments, the identity proxy may be configured and/or used to perform one or more of the following:

Secure authentication of users of mobile apps that do not natively support redirection to a separate IDP.

Secure access control with respect to mobile app users, incorporating dynamic information such as mobile device security posture, without exposing credentials to the service provider In various embodiments, a security proxy or other server is provided. A mobile client app or other app configured to access a cloud-based service is configured to authenticate via the security proxy. For example, the app may be configured to present a certificate, token, or other secure authentication information to the security proxy. The security proxy in various embodiments uses the certificate to authenticate the user and/or device. The security proxy uses information comprising or otherwise associated with the certificate to synthesize a Basic authorization header that includes a hash token of information associated with the requesting device and/or user. The synthesized Basic authorization header is sent to the cloud-based service on behalf of the requesting user/device. The token is used by the cloud-based service to obtain from an Identity Provider (IDP) and/or a proxy thereof a SAML assertion that authenticates the requesting user to the cloud-based service, resulting in the cloud-based service granting access to the service to the requesting user.

FIG. 1 is a block diagram illustrating an embodiment of a system to configure a mobile app to access to a cloud-based service. In the example shown, the system and environment 100 includes a mobile device 102 with a mobile device management (MDM) agent 104 installed thereon. The agent 104 is configured to be used to register the mobile device 102 with an enterprise mobile management (EMM) server 108. The EMM server 108 provides a configuration data 110, e.g., an application profile or other configuration data, which in turn is provided to a managed app 112 on the mobile device 102. In various embodiments, the configuration data 110 may include a certificate or other security information to be used to authenticate the managed app 112 and/or mobile device 102 to management entities, e.g., as described below in connection with FIG. 2. Managed app 112 may be associated with cloud-based service 114. For example, managed app 112 may be a client app provided by a service provider with which cloud-based service 114 is associated, or managed app 112 may be a third party app configured to access cloud-based service 114, such as by calling an API of cloud-based service 114. In some embodiments, managed app 112 may be an email application that uses the ActiveSync protocol to access email via cloud email servers, such as Office 365®.

Figure 2:
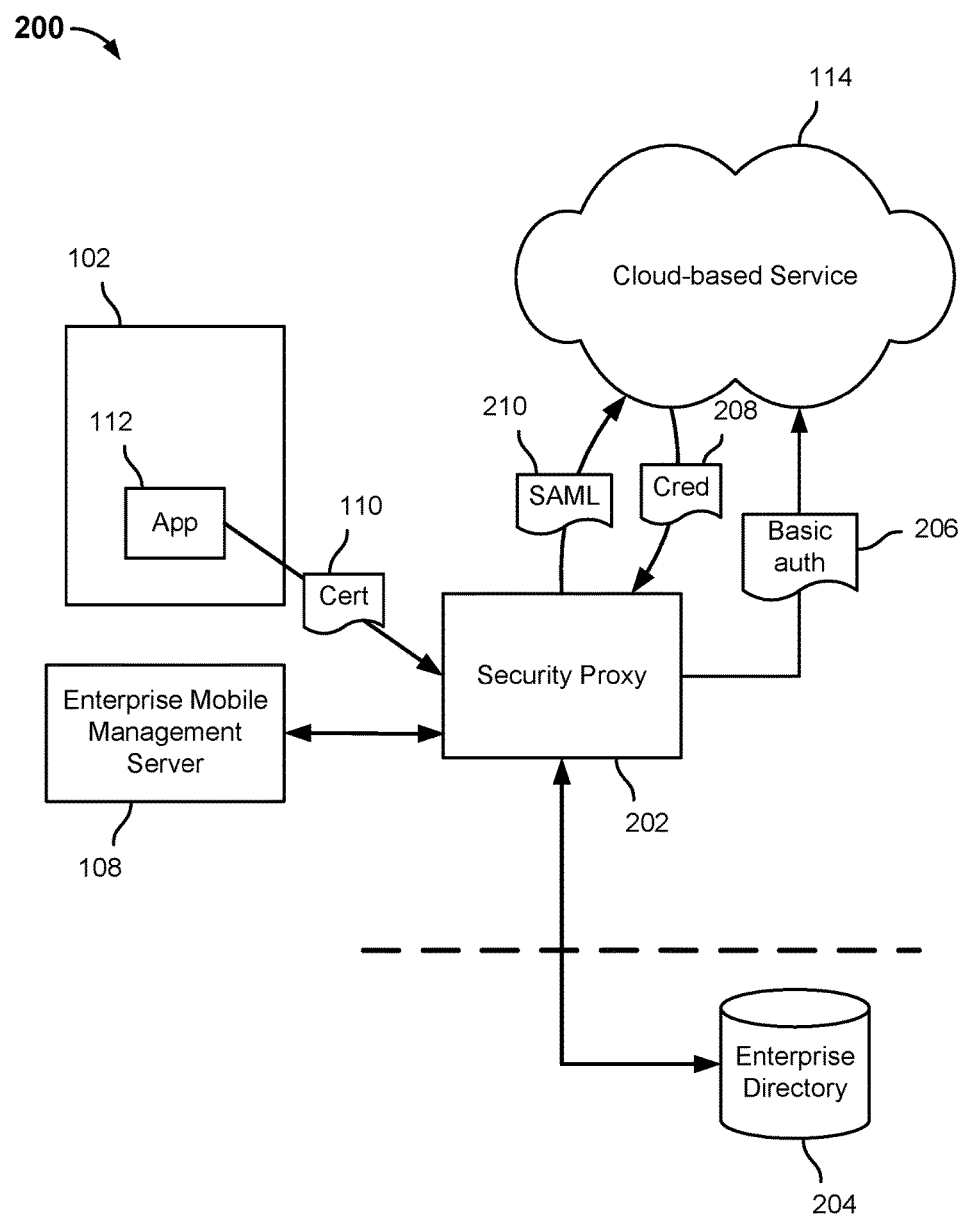
FIG. 2 is a block diagram illustrating an embodiment of a system to provide secure mobile access to a cloud-based service.

FIG. 2 is a block diagram illustrating an embodiment of a system to provide secure mobile access to a cloud-based service. In the example shown, the system and environment 200 includes mobile device 102 and managed app 112 installed thereon.

In some embodiments, managed app 112 may be associated with cloud-based service 114 but one or both of managed app 112 and cloud-based service 114 may not support redirection to another node to authenticate. Certain standards and/or protocols may require and/or may be configured so as to require that clients be redirected to an authentication node trusted by the service, either directly or through "chaining" or other federation techniques, to authenticate users. For example, under the Security Assertion Markup Language (SAML) standard, a client requesting to access a service may be redirected to an Identity Provider (IdP) trusted by the service to authenticate. If the client is determined by the IdP to be authorized to access the service, the IdP issues a SAML "assertion" (or other security token, under other standards) to be used by the client to authenticate to the service. The client presents the token to the service to access the service. However, certain mobile apps, such as ActiveSync email clients, do not support redirection.

In the example shown in FIG. 2, the configuration data provided to mobile device 102 to configure managed app 112 (e.g., by EMM server 108, via a connection not shown in FIG. 2) includes data that causes requests to access cloud-based service 114 to be made via a security proxy 202. In some embodiments, app 112 is not managed, per se. For example, in some embodiments, app 112 may be a native email client that is managed via a managed profile. A certificate data 110 included in the configuration data is provided to the security proxy 202. The security proxy 202 may be configured to determine whether one or more of the managed app 112, mobile device 102, and an associated user of mobile device 102 are authorized to access the cloud-based service 114. The determination may be made based on information included in certificate 110, other information obtained using information included in certificate 110, and/ or information from the protocol fields and HTTP headers. For example, information included in certificate 110 may be used to access enterprise directory information stored in an enterprise directory 204, such a Microsoft® Active Directory®. The security proxy 202 may be configured to base the determination as to whether access to cloud-based service 114 is authorized at least in part on security or other compliance posture information associated with mobile device 102. For example, security proxy 202 may receive device posture information from EMM server 108. If information received from EMM server 108 indicates the mobile device 108 may have been compromised, for example, access to the cloud-based service 114 may be denied.

In various embodiments, security proxy 202 may be configured to synthesize at least a portion of a Basic Authentication (BA) header 206 on behalf of the managed app 112 and mobile device 102. In some embodiments, a password portion of the BA header 206 is synthesized but the username portion is not modified. In the context of Hyper-text Transfer Protocol (HTTP) communications, a BA header provides a mechanism to transmit user credentials, such a username and password. In some embodiments, to avoid exposing the actual username and password credentials (either to the EMM server or security proxy, or to the service), a hash of information associated with one or more of the user, the app, the mobile device, and the certificate 110 may be hashed or otherwise transformed and/or obfuscated and used to populate fields in the BA header 206.

In various embodiments, the synthesized BA header 206 is presented to the cloud-based service 114 on behalf of the requesting client app 112. The cloud-based service 114 is configured to use the information in the synthesized BA header 206 to determine whether the user is authorized to access the service. In some embodiments, the cloud-based service 114 is configured to extract synthesized credentials 208 from the BA header 206 and to send the credentials 208 to an identity provider (IdP) associated with the service 114. In the example shown, the IdP associated with service 114 has been integrated into the security proxy 202. Security proxy 202 caches the credential information as included in the synthesized BA header 206, and when the same credentials 208 are returned to the IdP on security proxy 202, the IdP (or another entity on security proxy 202) uses the cached information to determine that access is authorized. Based on the determination that access is authorized, a SAML assertion 210 is generated by the IdP on security proxy 202 and presented to the cloud-based service 114 on behalf of the client app 112.

The cloud-based service 114 thereafter allows the client app 112 to access the service. In some embodiments, access is provided via the security proxy 202.

Figure 3:
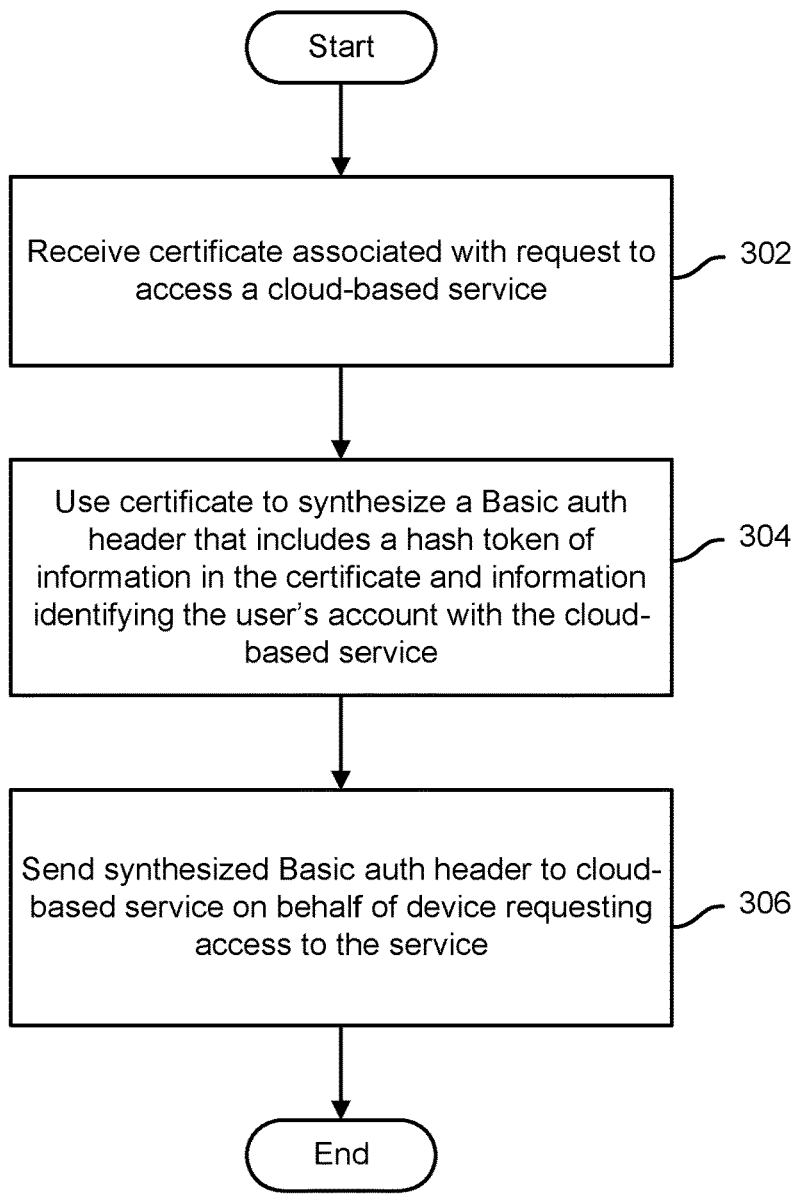
FIG. 3 is a flow chart illustrating an embodiment of a process to provide secure mobile access to a cloud-based service.

FIG. 3 is a flow chart illustrating an embodiment of a process to provide secure mobile access to a cloud-based service. In various embodiments, the process of FIG. 3 may be implemented by a security proxy, such as security proxy 202 of FIG. 2. In the example shown, a certificate associated with a request to access a cloud-based service is received (302). For example, in the example shown in FIG. 2, the certificate 110 is received from app 112 on mobile device 102. The certificate is used to synthesize a Basic Authentication (BA) header that includes, in this example, a hash token of information obtained from the certificate and/or information identifying the associated user's account with the cloud-based service (304), such as BA header 206 in the example shown in FIG. 2. The synthesized BA header is sent to the cloud-based service on behalf of the app/device requesting access (306), as in the example shown in FIG. 2.

Figure 4:
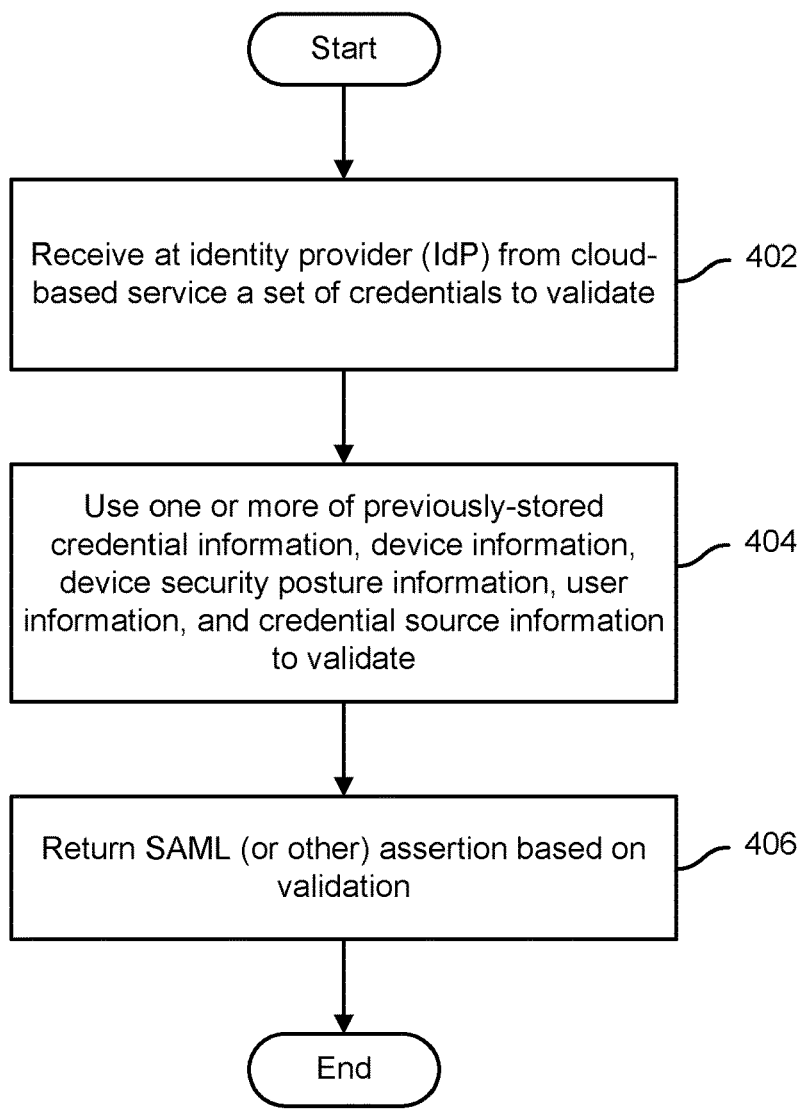
FIG. 4 is a flow chart illustrating an embodiment of a process to provide secure mobile access to a cloud-based service.

FIG. 4 is a flow chart illustrating an embodiment of a process to provide secure mobile access to a cloud-based service. In various embodiments, the process of FIG. 4 may be implemented by a security proxy, such as security proxy 202 of FIG. 2. In the example shown, a set of credentials to be validated are received at an identity provider from a cloud-based service (402), such as the credentials 208 in the example shown in FIG. 2. One or more of previously-stored credential information, device information, device security posture information, user information, and credential source information may be used to validate the credentials (404). For example, the received credentials received by a security proxy acting as identity provider for the cloud-based service, as in the example shown in FIG. 2, may use previously-cached credential information sent to the service by the security proxy itself, or by another node trusted by the security proxy. If the received credential information matches the cached information, for example, the credential information may be determined to be valid. In some embodiments, a security or other compliance posture of the associated mobile device may be checked, e.g., by querying an EMM server. If the credential information is determined to be valid, a SAML assertion or other security token is returned to the service (406) based on the determination that the credentials are valid and access is authorized.

Figure 5:
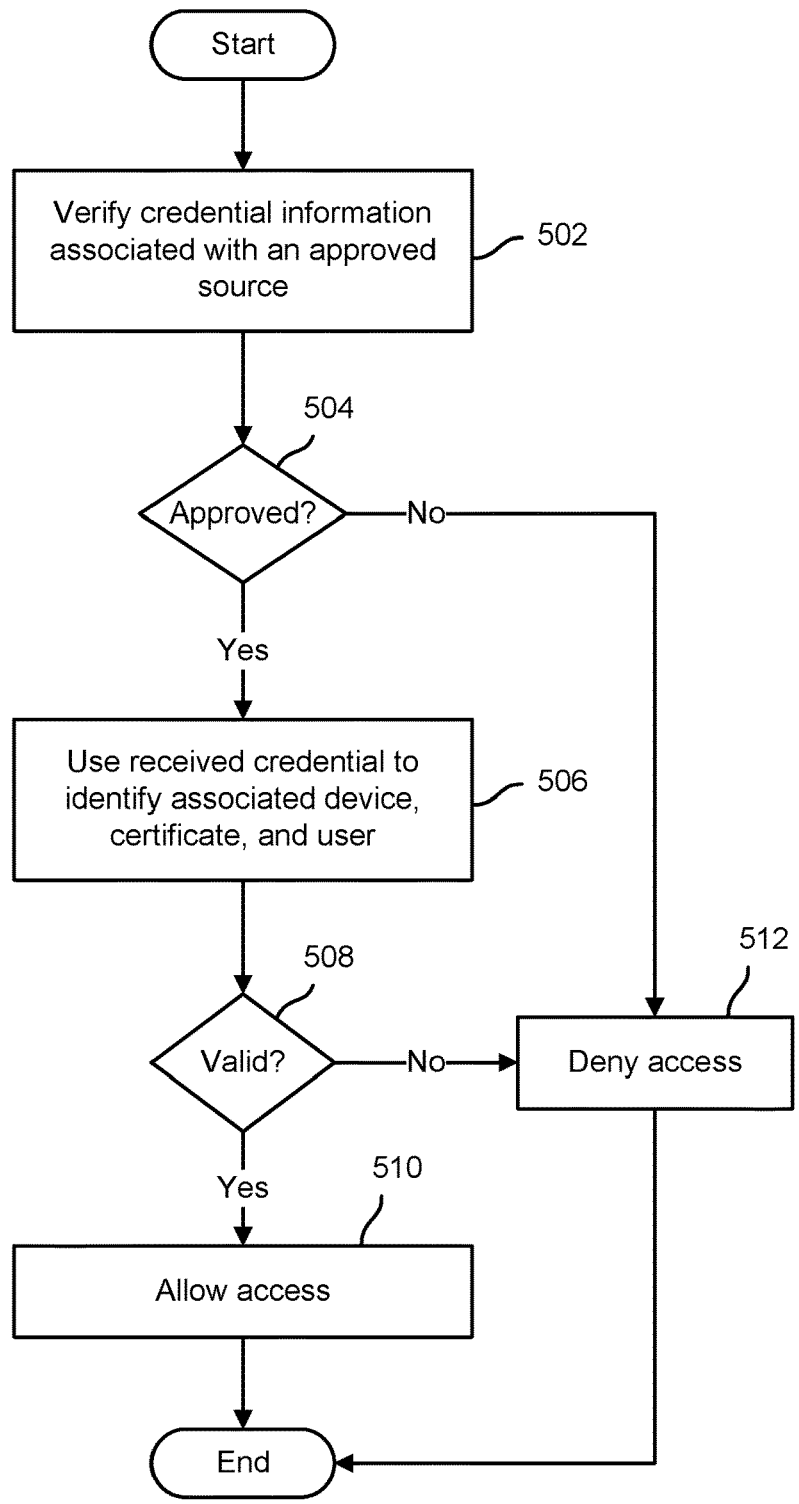
FIG. 5 is a flow chart illustrating an embodiment of a process to provide secure mobile access to a cloud-based service.

FIG. 5 is a flow chart illustrating an embodiment of a process to provide secure mobile access to a cloud-based service. In various embodiments, the process of FIG. 5 may be implemented by a security proxy, such as security proxy 202 of FIG. 2. In some embodiments, the process of FIG. 5 may be used to implement step 404 of the process of FIG. 4. In the example shown, received credential information is verified to have been provided (originally) by an approved (i.e., trusted) source (502). For example, if an enterprise has more than one security proxy installed, an address or other identifier associated with the security proxy that provided the credential information to the service (e.g., via a synthesized BA header, as in the example shown in FIG. 2) is checked to determine whether the credential information originated from a trusted source. If the credential information is determined to have originated from an approved source (504), the received credential information is used to identify one or more of an associated mobile device, requesting app, requesting user, and/or certificate information (506). For example, a security proxy that provided the credential information may cache both the credential information and data indicating the mobile device, user, etc. with which the credential information is associated. If based on all available information and configured checks (e.g., device compliance check) it is determined that the mobile device, app, and/or user is/are authorized to access the service (508), then access is allowed (510), for example by providing a valid SAML assertion, as in the example shown in FIG. 2. If the credential and/or associated information and checks based thereon indicate that access to the service is not currently authorized (508), then access is denied (512), e.g., by returning to one or both of the cloud-based service and the requesting app a response indicating that authentication failed.

In some embodiments, the application (e.g., native email client) may be configured to communicate directly with the cloud service (e.g., Office 365®). The security proxy (e.g., security proxy 202 of FIG. 2) in some embodiments only serves as an identity provider (IdP) proxy for the service. In some embodiments, the EMM server creates the password field of the BA header. This password has enough information to uniquely identify a specific email configuration pushed to the device (even when there are multiple email boxes configured). The service will send this BA header to the security proxy, as in the example shown in FIG. 2. The security proxy will reach out to EMM server with the password field and the EMM server will be able to identify the device and return the posture. The security proxy responds to the service with an allow/block SAML response.

Using techniques disclosed herein, secure mobile access to a cloud-based service may be provided, even in the context of a mobile app and/or cloud-based service not configured to support SAML or other protocols that require redirection, and without exposing user credentials (e.g., username and password) to either the mobile device or the cloud-based service.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method to provide secure mobile access to a cloud-based service, comprising:
receiving, at a security proxy, a request from a mobile device to access the cloud-based service, wherein the request includes a security certificate;
using the security certificate associated with the request to synthesize a basic authentication header associated with the request, wherein the basic authentication header includes a hash of information obtained from the security certificate;
sending the synthesized basic authentication header that includes the hash of information obtained from the security certificate to the cloud-based service on behalf of the mobile device, wherein the cloud-based service is configured to extract credential information from the synthesized basic authentication header and to send the extracted credential information to the security proxy;
using the extracted credential information to determine that access to the cloud based service is authorized; and
providing to the cloud based service a security token that indicates the mobile device is authorized to access the cloud-based service.

2. The method of claim 1, wherein the request is associated with a mobile app on the mobile device.

3. The method of claim 2, wherein the mobile app comprises a native email application.

4. The method of claim 1, wherein the cloud-based service is configured to allow the mobile device to access the cloud-based service based on the security token.

5. The method of claim 4, wherein the security proxy is remote from the cloud-based service and the synthesized basic authentication header is sent to the cloud-based service via a network.

6. The method of claim 1, wherein the security certificate comprises a certificate provisioned to the mobile device.

7. The method of claim 1, wherein using the security certificate to synthesize the basic authentication header includes using information comprising the security certificate to populate a data field of the basic authentication header.

8. The method of claim 1, wherein using the security certificate to synthesize the basic authentication header includes using information comprising the security certificate to retrieve a data value to populate a data field of the basic authentication header.

9. The method of claim 8, wherein the data value is retrieved via a call to a directory associated with the mobile device.

10. The method of claim 1, wherein the basic authentication header is synthesized at least in part by computing the hash based on credential information associated with the request to access the cloud-based service.

11. The method of claim 10, further comprising caching the credential information.

12. The method of claim 11, further comprising receiving from the cloud-based service a request to authenticate the extracted credential information, wherein the request to authenticate the extracted credential information includes the extracted credential information.

13. The method of claim 12, further comprising comparing the received extracted credential information with the cached credential information to authenticate the received extracted credential information.

14. The method of claim 13, wherein the security token is provided to the cloud-based service based at least in part on said authentication of the received extracted credential information.

15. The method of claim 14, wherein the security token comprises a Security Assertion Markup Language (SAML) assertion.

16. The method of claim 1, wherein the security certificate associated with the request is used to synthesize a basic authentication header associated with the request based at least in part on a determination that access is authorized.

17. A system to provide secure mobile access to a cloud-based service, comprising:
a communication interface; and
a processor coupled to the communication interface and configured to:
receive, at a security proxy, a request from a mobile device to access the cloud-based service, wherein the request includes a security certificate;
use the security certificate associated with the request to synthesize a basic authentication header associated with the request, wherein the basic authentication header includes a hash of information obtained from the security certificate;
send the synthesized basic authentication header that includes the hash of information obtained from the security certificate to the cloud-based service on behalf of the mobile device, wherein the cloud-based service is configured to extract credential information from the synthesized basic authentication header and to send the extracted credential information to the security proxy;
use the extracted credential information to determine that access to the cloud-based service is authorized; and
provide to the cloud based service a security token that indicates the mobile device is authorized to access the cloud-based service.

18. The system of claim 17, wherein the basic authentication header is synthesized at least in part by computing the hash based on credential information associated with the request to access the cloud-based service.

19. A computer program product to provide secure mobile access to a cloud-based service, the computer program product being embodied in a non-transitory computer readable medium and comprising computer instructions for:
receiving, at a security proxy, a request from a mobile device to access the cloud-based service, wherein the request includes a security certificate;
using the security certificate associated with the request to synthesize a basic authentication header associated with the request, wherein the basic authentication header includes a hash of information obtained from the security certificate;
sending the synthesized basic authentication header that includes the hash of information obtained from the security certificate to the cloud-based service on behalf of the mobile device, wherein the cloud-based service is configured to extract credential information from the synthesized basic authentication header and to send the extracted credential information to the security proxy;
using the extracted credential information to determine that access to the cloud-based service is authorized; and
providing to the cloud based service a security token that indicates the mobile device is authorized to access the cloud-based service.

* * * * *